United States Patent [19]

Schennum et al.

[11] Patent Number: 5,842,682

[45] Date of Patent: Dec. 1, 1998

[54] NON-LEAKING, NON-VENTING LIQUID FILLED CANISTER QUICK DISCONNECT SYSTEM

[75] Inventors: Steven M. Schennum, West Chester, Ohio; Reuben E. Oder, Union, Ky.; Christopher M. Miller, Milford, Ohio; John J. Schwartz; Vernon S. Ping, both of Cincinnati, Ohio

[73] Assignee: The Procter & Gamble Company, Cincinnati, Ohio

[21] Appl. No.: 756,997

[22] Filed: Nov. 26, 1996

[51] Int. Cl.$^6$ ........................................... F16L 37/28
[52] U.S. Cl. ..................... 251/149.1; 251/149.6; 285/317
[58] Field of Search ............. 251/149.1, 149.6; 137/854; 285/317

[56] References Cited

U.S. PATENT DOCUMENTS

| D. 357,307 | 4/1995 | Ramacier, Jr. et al. . | |
|---|---|---|---|
| 3,884,256 | 5/1975 | Corlet | 251/149.1 X |
| 3,918,679 | 11/1975 | Silvana | 251/149.1 |
| 4,436,125 | 3/1984 | Blenkush . | |
| 4,613,112 | 9/1986 | Philipot et al. | 251/149.6 |
| 4,683,916 | 8/1987 | Raines . | |
| 4,693,242 | 9/1987 | Biard | 251/149.6 X |
| 5,052,725 | 10/1991 | Meyer et al. . | |
| 5,090,747 | 2/1992 | Kotake . | |
| 5,104,158 | 4/1992 | Meyer et al. . | |
| 5,433,353 | 7/1995 | Flinn . | |
| 5,494,074 | 2/1996 | Ramacier, Jr. et al. . | |
| 5,507,318 | 4/1996 | Israelson . | |
| 5,509,433 | 4/1996 | Paradis | 251/149.1 X |
| 5,556,005 | 9/1996 | Banks | 251/149.1 X |

FOREIGN PATENT DOCUMENTS

4035581 A1  5/1991  Germany .

OTHER PUBLICATIONS

Research Disclosure (Apr. 1993), No. 348, Emsworth, GB — "O–Ring Check Valve Seal" p. 269, by Michael Dougherty.

*Primary Examiner*—Kevin Lee
*Attorney, Agent, or Firm*—Elizabeth M. Koch

[57] ABSTRACT

A quick disconnect has a first member having an outlet with at least one passageway, an umbrella valve movably attached within the outlet for sealing the passageway, and a second member having an inlet with at least one finger which releasably engages the passageway and displaces the umbrella valve when the first and second members are removably engaged, thereby unsealing the umbrella valve from the passageway and allowing open communication from the outlet to the inlet.

12 Claims, 2 Drawing Sheets

NON-LEAKING, NON-VENTING LIQUID FILLED CANISTER QUICK DISCONNECT SYSTEM

FIELD OF THE INVENTION

This invention relates to the field of quick disconnects, and more particularly, to a non-leaking, non-venting quick disconnect system for an inverted liquid filled canister.

BACKGROUND OF THE INVENTION

Recently, cleaning implements, such as mops, have been developed which utilize a canister attached to a liquid delivery system containing a sprayer nozzle to dispense cleaning fluid in the vicinity of a disposable pad attached to a cleaning head member. These devices typically use a removable canister which is inserted within a receptacle (housing) attached to the device's handle. However, these canister and receptacle systems have numerous problems. For example, these canister's typically leak before and after loading, particularly when the canister is inverted. In addition, these canisters must be loaded into the receptacle by twisting or turning the canister using conventional threading. After loading, these canisters typically require venting to dispense their contents properly. For at least these reasons, current canister liquid delivery systems are inefficient and inconvenient.

Therefore, what is needed is a non-leaking, non-venting, quick disconnect system for an inverted liquid filled canister which prevents leakage, requires no venting and is self-aligning without the use of threading or twisting to load the canister.

SUMMARY OF THE INVENTION

Accordingly, it is an object of the present invention to provide an improved quick disconnect system.

It is a further object of the present invention to provide a quick disconnect that comprises a first member having an outlet with at least one passageway, an umbrella valve movably attached within the outlet for sealing the passageway, and a second member having an inlet with at least one finger which releasably engages the passageway and displaces the umbrella valve when the first and second members are removably engaged, thereby unsealing the umbrella valve from the passageway and allowing open communication from the outlet to the inlet.

DETAILED DESCRIPTION OF THE INVENTION

Figure 1:
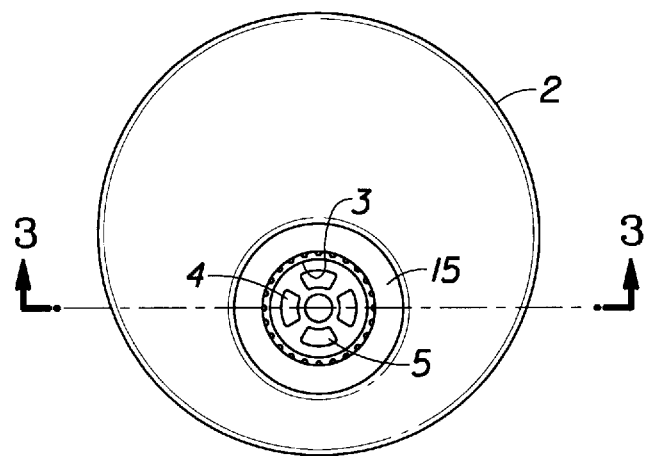
FIG. 1 is a top view of the preferred outlet according to the preferred embodiment of the present invention.
Figure 2:
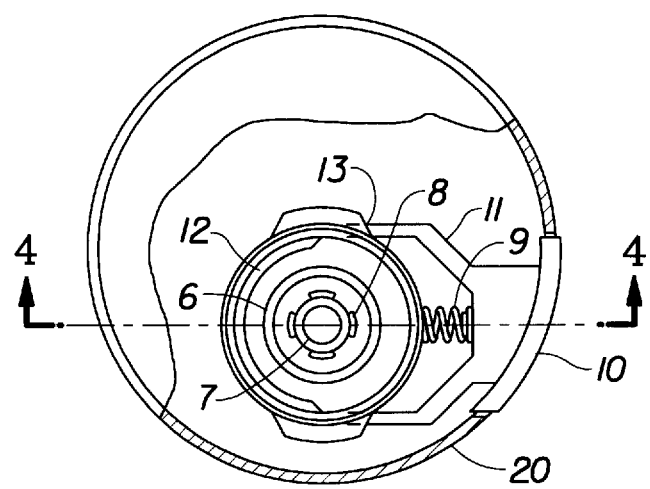
FIG. 2 is a top view of the preferred inlet according to the preferred embodiment of the present invention.
Figure 3:
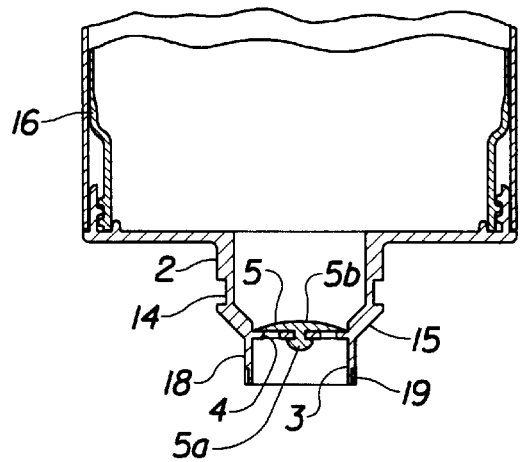
FIG. 3 is a rotated cross sectional view of the umbrella valve seated within the outlet taken along line 3—3 of FIG. 1 according to the preferred embodiment of the present invention.
Figure 4:
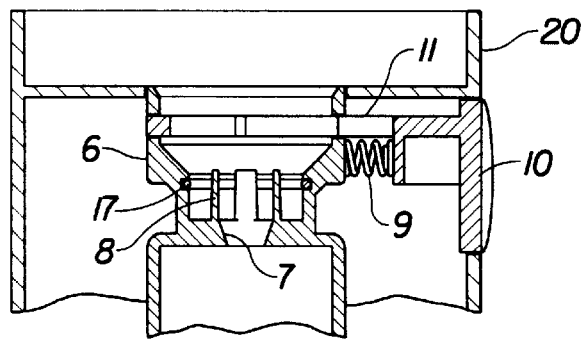
FIG. 4 is a rotated cross sectional view of the spring activated push button lock and inlet taken along line 4—4 of FIG. 2 according to the preferred embodiment of the present invention.

Referring to FIGS. 1–5, the preferred non-leaking quick disconnect 1 includes a first member 2 having an outlet 3 (FIGS. 1 and 3) with at least one passageway 4, a flexible umbrella valve 5 positioned within the outlet 3 for sealing the passageway 4, and a second member 6 having an inlet 7 (FIGS. 2 and 4) with at least one finger 8. In addition, a spring 9 activated push button 10 locking mechanism 11 releasably snap locks the first member 2 and second member 6 together. The locking mechanism 11 preferably has a snap-lock 12 which engages a guide slot 13 of the second member 6 and releasably engages an indentation 14 of the first member 2 when the first and second members 2, 6 are removably engaged. The outlet 3 is radially offset from the first member 2 and has a chamfered exterior 15 for guiding the outlet 3 within the second member 6. The inlet 7 is radially offset from a housing 20 which supports the first member 2 and the bottle 16.

The first member 2 is preferably a liquid filled canister. When the first member 2 is inverted (FIG. 3), the umbrella valve 5 seals the liquid within the first member 2. The umbrella valve 5 is biased in a closed or sealed position (FIG. 3) due to the spring force of the umbrella valve 5 in the assembled, inherently pre-loaded condition. The hydrostatic force of the liquid ensures a tight seal and the liquid remains within the first member 2 without leaking through the outlet 3. Furthermore, the first member 2 preferably includes a collapsible bottle 16 for supplying the liquid to the outlet 3, thus avoiding the need to provide a vent within the first member 2. As a result, the non-vented collapsible bottle 16 allows the liquid to be dispensed in any orientation as long as a force is exerted on the bottle 16 from, for example, gravity, a pumping mechanism or manually squeezing the bottle 16.

An O-ring 17 prevents the liquid from leaking through the outlet 3 prior to the first member 2 being properly seated within the second member 6. The O-ring 17 engages an exterior surface 18, above the serrations 19, of the outlet 3 upon engagement of the first and second members 2, 6. The surface 18 has serrations 19 which reduce the likelihood that the umbrella valve 5 from being pulled through the passageways 4 due to the suction created when the first member 2 is disengaged from the second member 6.

Preferably, the valve 5 is formed of a silicon polymer in the shape of an umbrella but may be formed in a variety of shapes and materials without deviating from the intent of the invention. For example, the valve 5 may be a spring-loaded ball valve. In addition, the umbrella valve 5 comprises a stem 5a and umbrella skirt 5b, both of which are preferably inherently pre-loaded.

Figure 5:
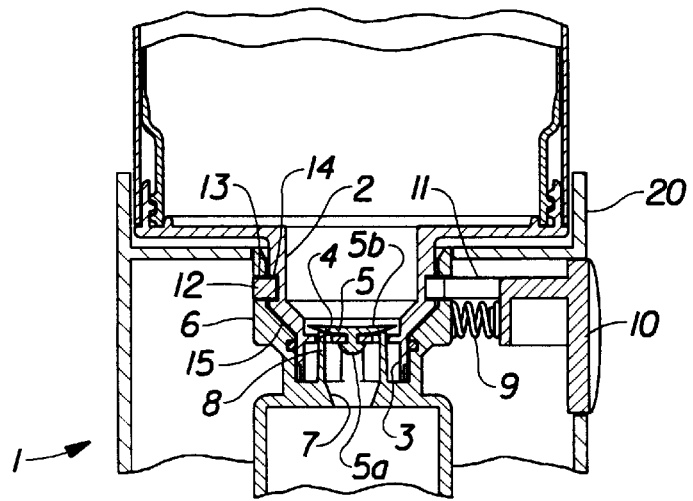
FIG. 5 is a rotated cross sectional view of the first and second members engaged according to the preferred embodiment of the present invention.

In operation, the offset outlet 3 of the first member 2 is inserted within the offset inlet 7 of the second member 6 (FIG. 5). Since both the outlet 3 and the inlet 7 are radially offset, the outlet 3 and the inlet 7 are axially aligned upon engagement with the first and second members 2, 6. The chamfered exterior 15 of the first member 2 automatically guides the first and second members 2, 6 upon insertion of the first member 2 within the second member 6. After insertion, the chamfered exterior 15 engages the snap lock 12, partially compressing the spring 9 and displacing the snap lock 12 along the guide slot 13. Meanwhile, the surface 18 engages the O-ring 17 which creates a seal prior to the fingers 8 entering the passageways 4 and displacing the skirt 5b of the umbrella valve 5. After the fingers 8 have entered the passageways 4, the skirt 5b of the umbrella valve 5 is temporarily deformed from the original inherently pre-loaded condition.

Upon further insertion of the first and second members 2, 6, the chamfered exterior 15 moves past the snap lock 12, decompressing the spring and forcing the snap lock 12 within the indentation 14 of the first member 2. The force of the spring 9 decompressing will cause the snap lock 12 to snap within the indentation 14, thereby creating an auditory sound which ensures the user that the first member 2 is inserted properly within the second member 6.

Upon insertion, the fingers 8 of the second member 6 engage the passageways 4 of the first member 2. Upon engagement, the fingers 8 extend within the passageways such that the skirt 5b of the umbrella valve 5 is displaced away from the passageways (FIG. 5) and the seal created by the umbrella skirt 5b is broken. The seal will remain open, allowing open communication between the first member 2 and the second member 6, as long as the first and second members 2, 6 are engaged and the fingers 8 extend at least partially within the passageways 4, enough to deflect the skirt 5b of the umbrella valve 5 (FIG. 5).

To disconnect the first and second members 2, 6, and restore the seal created by the umbrella valve 5, the push button 10 is activated by an external force which deflects the spring 9. Upon activation, the spring 9 is compressed, allowing the snap lock 12 of the locking mechanism 11 to disengage the indentation 14 of the first member 2. After the snap lock 12 has fully disengaged the indentation 14, the first member 2 may be removed from the second member 6. Upon removal, the fingers 8 of the second member 6 disengage the skirt 5b of the umbrella valve 5 and the passageways 4. The hydrostatic force of the liquid within the first member 2 coupled with the spring force inherent within the geometry of the inherently pre-loaded valve 5 will force the valve 5 to again seal the passageways 4 and prevent leakage of the liquid. Due to the inherent pre-load of the umbrella valve 5, the valve 5 may be used repeatedly while returning to the basic installed position (FIG. 3), maintaining a non-leaking seal of the liquid within the first member 2, and avoiding an inversion of the umbrella skirt 5b (FIG. 5).

While the embodiment of the invention shown and described is fully capable of achieving the results desired, it is to be understood that this embodiment has been shown and described for purposes of illustration only and not for purposes of limitation. Other variations in the form and details that occur to those skilled in the art and which are within the spirit and scope of the invention are not specifically addressed. Therefore, the invention is limited only by the appended claims.

What is claimed is:

1. A quick disconnect, comprising:

a first member having an outlet with at least one passageway, wherein said outlet is radially offset from said first member;

an inherently pre-loaded umbrella valve having a stem and a skirt, said skirt movably attached within said outlet for sealing said at least one passageway; and a second member having an inlet with at least one offset finger which releasably engages said at least one passageway and displaces said skirt of said umbrella valve when said first and second members are removably engaged, thereby unsealing said skirt of said umbrella valve from said at least one passageway and allowing open communication from said outlet to said inlet, wherein said inlet is radially offset from said first member, and said offset outlet and said offset inlet are axially aligned when said first and second members are removably engaged.

2. The quick disconnect of claim 1, further comprising a locking mechanism for releasably engaging said first and second members.

3. The quick disconnect of claim 2, wherein said locking mechanism comprises a spring activated lock.

4. The quick disconnect of claim 3, wherein said spring activated lock comprises a snap lock, guided within a guide slot of said second member, which releasably engages an indentation of said first member when said first and second members are removably engaged.

5. The quick disconnect of claim 4, wherein said snap lock creates an auditory sound upon engagement with said indentation.

6. The quick disconnect of claim 1, further comprising an O-ring seated adjacent to said at least one finger for engagement with said outlet.

7. The quick disconnect of claim 1, wherein said first member has a collapsible bottle in open communication with said outlet.

8. The quick disconnect of claim 7, wherein said collapsible bottle is non-vented.

9. The quick disconnect of claim 1, wherein an exterior surface of said outlet has serrations.

10. The quick disconnect of claim 1, wherein said umbrella valve reseals said at least one passageway after said at least one finger releasably disengages said at least one passageway.

11. The quick disconnect of claim 10, further comprising a support housing for supporting said first member.

12. The quick disconnect of claim 11, wherein said inlet is radially offset from said support housing.

* * * * *

UNITED STATES PATENT AND TRADEMARK OFFICE
CERTIFICATE OF CORRECTION

PATENT NO. : 5,842,682
DATED : December 1, 1998
INVENTOR(S) : Steven M. Schennum et al.

It is certified that error appears in the above-identified patent and that said Letters Patent is hereby corrected as shown below:

Claim 11,
Line 1, please delete "claim 10" and insert therefore -- claim 1--.

Signed and Sealed this

Eighteenth Day of September, 2001

*Attest:*

NICHOLAS P. GODICI
*Attesting Officer*     *Acting Director of the United States Patent and Trademark Office*